United States Patent
Ohie et al.

[15] 3,703,941
[45] Nov. 28, 1972

[54] PARKING BRAKE

[72] Inventors: Koichi Ohie, Tokyo; Koji Enomoto, Yokohama, both of Japan

[73] Assignee: Nissan Motor Company, Limited, Yokohama, Japan

[22] Filed: Jan. 15, 1971

[21] Appl. No.: 106,658

[30] Foreign Application Priority Data

Jan. 17, 1970 Japan......................45/4262

[52] U.S. Cl..........................188/31, 188/69, 192/4 A
[51] Int. Cl. ................................................B60t 1/06
[58] Field of Search..........188/31, 69, 167, 168, 265; 192/4 A, 109 A; 74/688, 752, 754, 765

[56] References Cited

UNITED STATES PATENTS

| | | | |
|---|---|---|---|
| 3,300,001 | 1/1967 | Stockton | 192/4 A |
| 3,078,964 | 2/1963 | Wildhaber | 188/69 |
| 3,361,234 | 1/1968 | Runyon | 192/4 A |
| 3,601,230 | 8/1971 | Platz | 188/31 |

*Primary Examiner*—Evon C. Blunk
*Assistant Examiner*—Johnny D. Cherry
*Attorney*—McCarthy, Depaoli & O'Brien

[57] ABSTRACT

A parking brake for use with an automatic power transmission mechanism having a parking gear which is engaged or disengaged by a brake pawl with or from a brake pawl upon shifting movement of a rotary shaft through a mechanical linkage. A cam member is rotatably mounted around the rotary shaft and is operatively connected thereto by a torsion spring. Rotation of the rotary shaft in one direction causes rotation of the cam member in the same direction to move the brake pawl into engagement with the parking gear thereby locking it against rotation in either direction. If the tooth of the brake pawl is misaligned with respect to a space between two adjacent teeth of the parking gear, the torsion spring yields and exerts a pressure on the brake pawl that tends to urge it toward the braking or locking position. When the parking gear moves slightly, the spring force will snap the brake pawl into braking position.

3 Claims, 16 Drawing Figures

INVENTORS
KOICHI OHIE
BY KOJI ENOMOTO

ATTORNEYS

INVENTORS
KOICHI OHIE
BY KOJI ENOMOTO
ATTORNEYS

PARKING BRAKE

This invention relates to parking brake mechanisms and more particularly to a parking brake for use with an automatic power transmission mechanism.

Automotive vehicles having an automatic power transmission mechanism usually are equipped with a parking brake is capable of anchoring an output shaft of the mechanism. The parking brake includes a parking gear carried by the output shaft and a brake pawl which is engageable with the parking gear to lock it against rotation in either direction upon shifting movement of a shift lever to a parking position. The parking brake further includes means for permitting the brake pawl automatically to move toward the braking position even if the tooth of the brake pawl is misaligned with respect to a space between two adjacent teeth of the parking gear. That is, the brake pawl is urged or biased toward the braking position by the action of a spring and then snaps into its place when the tooth of the brake pawl is brought into registry with a space between two adjacent teeth of the parking gear by slight movement of the parking gear.

Such conventional parking brake employs a ratchet lever having a cam surface and a control rod carrying thereon a cam portion to fulfil the function described above. Upon shifting movement of a shift lever, the cam portion engages with and rides over the cam surface of the ratchet lever to urge the brake pawl into engagement with the parking gear thereby locking it against rotation in either direction. However, these parking brakes are disadvantageous in their complicated construction.

It is therefore an object of this invention to provide a parking brake for use with an automatic power transmission mechanism which is characterized in its simple construction.

It is another object of this invention to provide a parking brake for an automatic power transmission mechanism in an automotive vehicle having a laterally mounted engine whose output shaft is laterally journaled.

Figure 1:
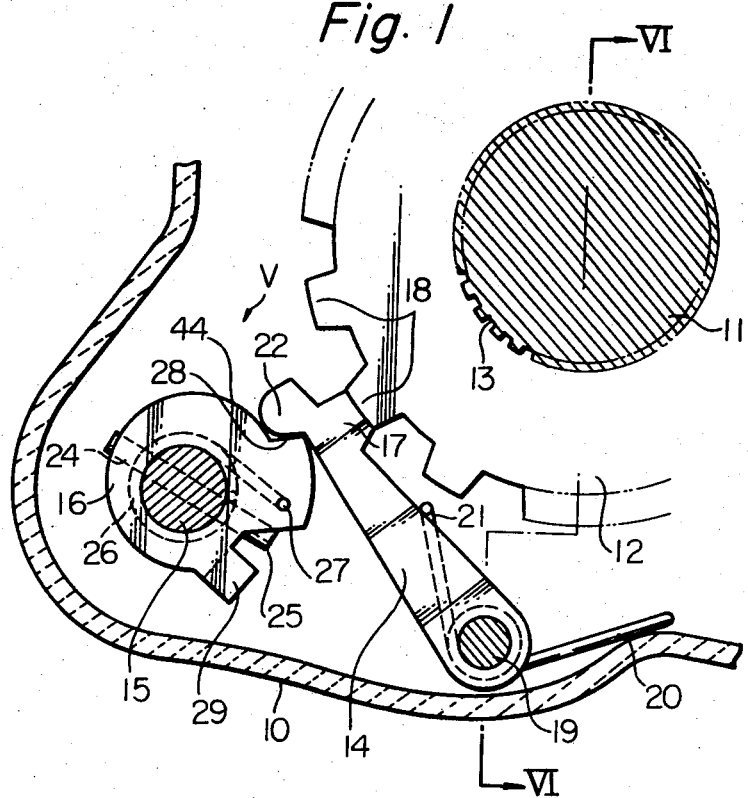
FIG. 1 is a schematic diagram showing a parking brake for an automatic power transmission mechanism constructed in accordance with one embodiment of this invention.
Figure 2:
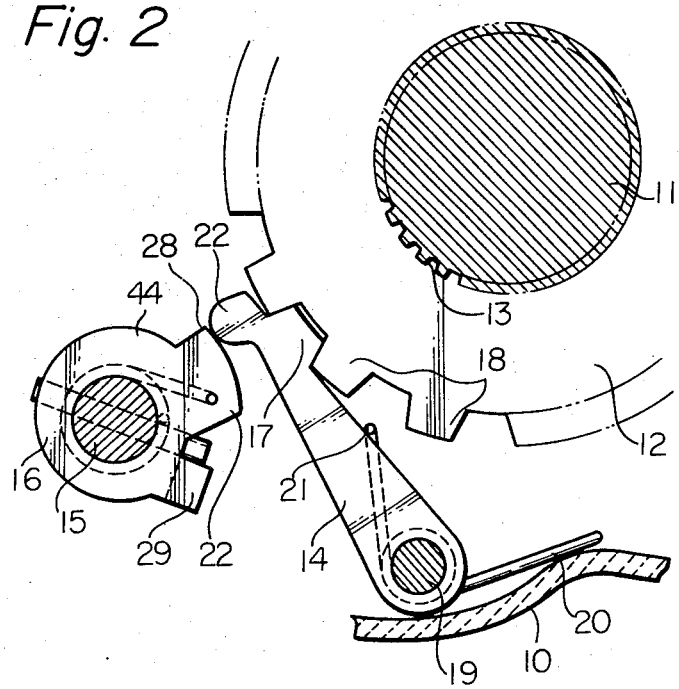
FIG. 2 is a view similar to FIG. 1 but shows a parking gear when it is locked by a brake pawl against rotation in either direction.
Figure 6:
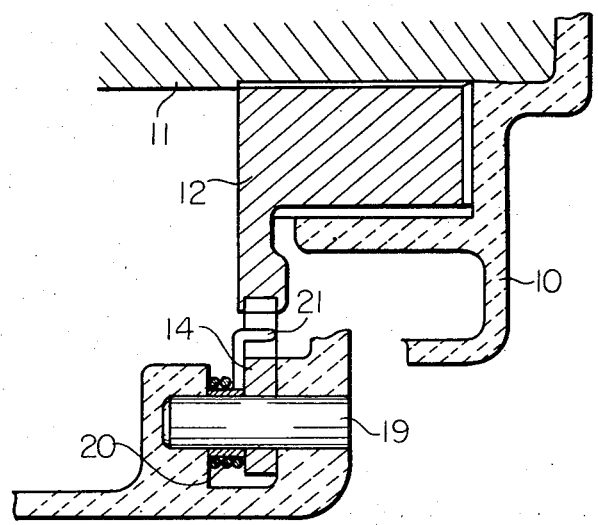
FIG. 6 is a sectional view taken on line VI—VI of FIG. 1.

Referring now to FIGS. 1 and 2, the parking brake mechanism depicted comprises a housing 10, an output shaft 11 rotatably journaled in the housing 10, a parking gear 12 splined at 13 to the output shaft 11, a brake pawl 14 mounted at one end thereof on the housing 10 for angular oscillation into and out of engagement with the parking gear 12 at the other end thereof, a rotary shaft 15 mounted on the housing 10 for rotation about an axis generally parallel to the output shaft 11, and a cam member 16 rotatably mounted around the rotary shaft 15. The brake pawl 14 has at its one end a tooth 17 which is engageable with the teeth 18 formed around the periphery of the parking gear 12. The brake pawl 14 is rotatably mounted at the other end around a pin 19. A return spring 20 is wound about the pin 19 and one end thereof engages with a portion of the brake 14 at 21 as best shown in FIG. 6. The other end of the return spring 20 engages with the stationary housing 10 at a point that is radially spaced from the axis of the pin 19. The return spring 20 is preloaded so that the brake pawl 14 normally is biased in a counter-clockwise direction as viewed in FIGS. 1 and 2, thereby tending to normally move the tooth 17 out of engagement with the teeth 18 of the parking gear 12. The brake pawl 14 further includes an enlargement 22 formed at the end thereof.

Figure 3:
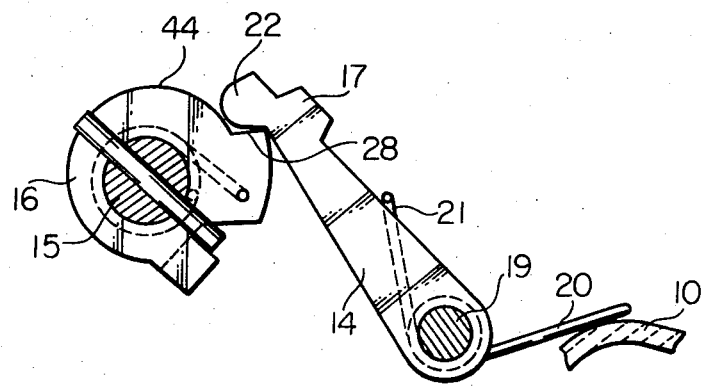
FIG. 3 is a schematic diagram showing a rotary shaft, cam member and brake pawl in their reverse drive position.
Figure 4:
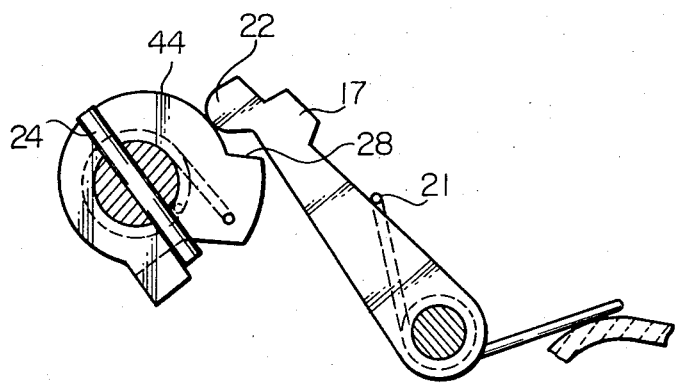
FIG. 4 is a schematic diagram showing the rotary shaft, cam member and brake pawl in their neutral position.
Figure 5:
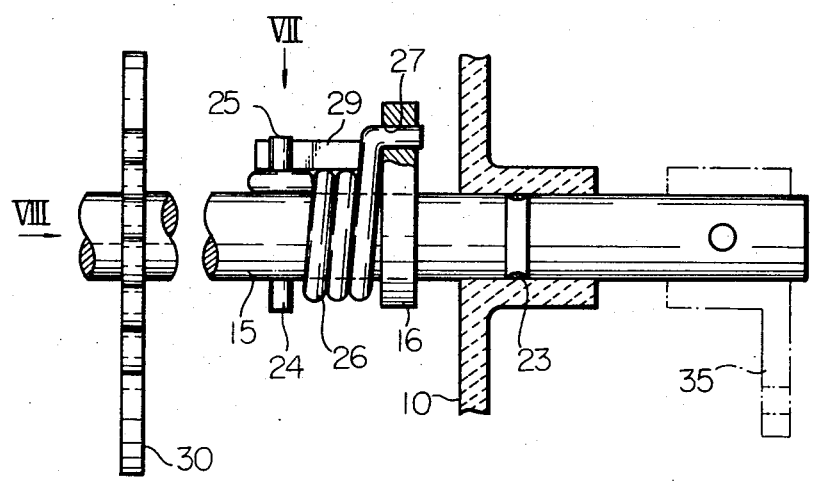
FIG. 5 is a side view of the rotary shaft and its associated parts as viewed in a direction of arrow V of FIG. 1.
Figure 7:
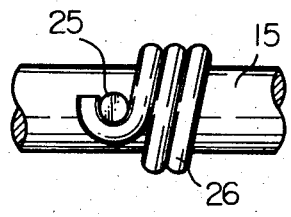
FIG. 7 is a schematic view of an anchor pin and a second spring member as viewed in a direction of arrow VII of FIG. 5.

As best shown in FIG. 5, the rotary shaft 15 is rotatably journaled in the housing 10. An O-ring 23 may be hermetically mounted on the rotary shaft 15 at a position where it extends into the housing 10. The rotary shaft 15 is formed with diametrically extending hole in which an anchor pin 24 is mounted. The heat portion 25 of the anchor pin 24 projects from the rotary shaft 15. A torsion spring 26 is wound about the rotary shaft 15 and one end thereof is secured to the head portion 25 of the anchor pin 24 as best seen in FIG. 7. The other end of the torsion spring 26 is inserted into a hole 27 formed in the cam member 16. The cam member 16 has a cam surface 28 engageable with the enlargement 22 of the brake pawl 14 and an integrally formed stop member 29 extending perpendicularly to the axis of the rotary shaft 15. The stop member 29 is engageable with the head portion 25 of the anchor pin 24 upon angular movement of the rotary shaft 15 relative to the cam member 16. The torsion spring 26 is preloaded so that the cam member 16 is biased in a counterclockwise direction as viewed in FIGS. 1 and 2 thereby tending normally to cause the stop member 29 to engage with the head portion 25 of the anchor pin 24 as shown in FIGS. 2, 3 and 4.

Figure 8:
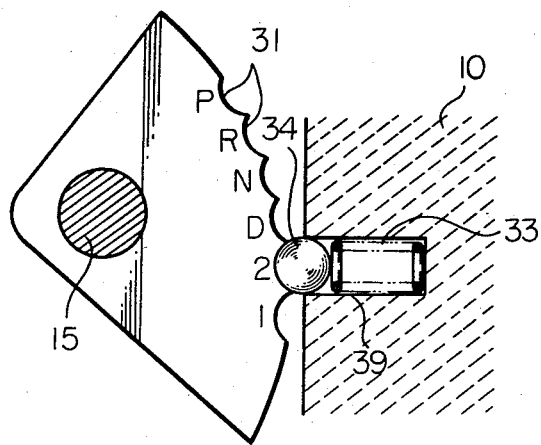
FIG. 8 is a schematic view of a lock plate secured to the rotary shaft as viewed in a direction of arrow VIII of FIG. 5.

The rotary shaft 15 carries a lock plate 30, a plan view of which is shown in FIG. 8. The lock plate 30 is of generally sectoral shape having formed at its circular portion six recesses 31 each corresponding to one of six selected gear positions, namely, parking, reverse, neutral, drive, 2 and 1.

A hole 32 is provided in the housing 10 at a position immediately adjacent to the lock plate 30. In the hole 32 are provided a spring 33 and a ball 34 which is urged toward one of the six recesses 31 by the action of the spring 33.

Figure 9:
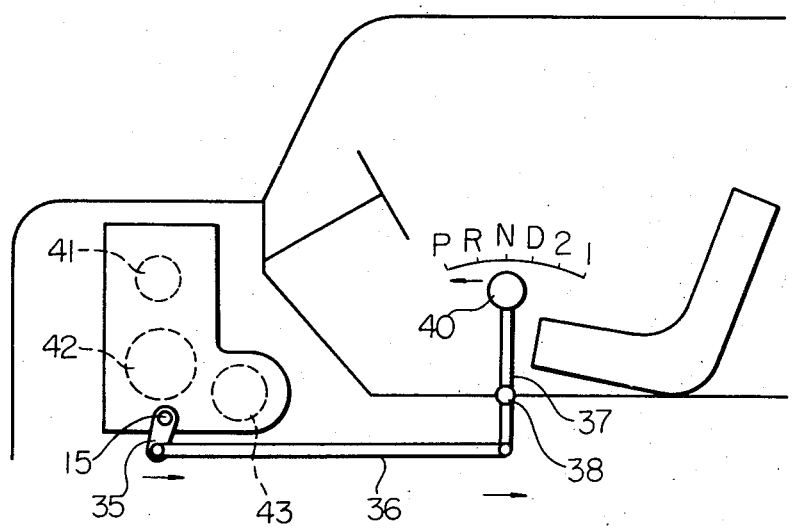
FIG. 9 is a schematic diagram showing a mechanical linkage that connects a manually operable member with the parking brake mechanism of this invention.

A lever 35 is secured to the rotary shaft 15 at an end opposite to the lock plate 30, as shown in FIGS. 5 and 9. As best seen in FIG. 9, a rod 36 is operatively connected at one end to the lever 35 and at the other end to another rod 37 which is pivotally mounted on a pivot 38. The end of the rod 37 opposite to the rod 36 carries a manual knob 40 which is adapted to operate the rotary shaft 15 through the mechanical linkage. In this connection it is to be noted that reference character 41 designates a laterally mounted engine, 42 a transmission mechanism, and 43 a differential gear device.

In operation, movement of the control knob 40 in a counterclockwise direction as viewed in FIG. 9 causes the rotary shaft 15 to rotate in a clockwise direction as viewed in FIG. 8, so that the ball 34 is received successively in the six recesses 31 formed in the lock plate 30. When the control knob 40 is advanced to a neutral position, the rotary shaft 15 and the cam member 16 will assume the positions shown in FIG. 4. In this position, the enlargement 22 of the brake pawl 14 is being biased into engagement with the minor diameter part 44 of the cam member 16 by the return spring 20, so that the tooth 17 is moved out of engagement with the teeth 18 of the parking gear 12. Since the torsion spring 26 is preloaded so that the cam member 16 is biased in a counterclockwise direction as viewed in FIG. 4, the stop member 29 integrally formed on the cam member 16 is urged into engagement with the head portion 25 of the anchor pin 24.

When the rotary shaft 15 is subsequently rotated to a reverse position, the cam member 16 will assume the position as shown in FIG. 3.

In this position, the cam surface 28 is out of engagement with the enlargement 22 which in turn remains engaging with the minor diameter part 44 of the cam member 16. Thus, the tooth 17 of the brake pawl 14 is out of engagement with the teeth 18 of the parking gear 12, so that the parking gear 12 is not locked against rotation in either direction.

Subsequent movement of the rotary shaft 15 in a counterclockwise direction toward the parking position will cause the cam surface 28 of the cam member 16 to engage with the enlargement 22 of the brake pawl 14, thereby urging the brake pawl 14 toward the braking position. If the tooth 17 of the brake pawl 14 is aligned with a space between two adjacent teeth 18 of the parking gear 12. The enlargement 22 of the brake pawl 14 will ride over the cam surface 28 of the cam member 16 under the influence of the camming action of the cam surface 28, as the rotary shaft 15 is rotated in a counterclockwise direction, as shown in FIG. 2. Thus, the tooth 17 of the brake pawl 14 is received in a space between two adjacent teeth 18 of the parking gear 12, thereby locking it against rotation in either direction. If, however, the tooth 17 is positioned directly adjacent to the major diameter part of a tooth 18, it will be impossible for the brake pawl 14 to move toward the braking position. In this case, the cam member 16 will maintain its position while the torsion spring 26 is yielding to permit continuous moving of the manually operable knob 40 to a position that normally would correspond to the braking position. This causes the torsion spring 26 to exert on the brake pawl 14 a pressure that tends to urge it toward the braking position as the anchor pin 24 is moved out of engagement with the stop member 29 as shown in FIG. 1. When the output shaft 11 rotates slightly together with the parking gear 12, the tooth 17 then is brought into registry with a space between two adjacent teeth 18 and the brake pawl 14 then snaps into the space as the cam member 16 again assumes the position shown in FIG. 2.

When it is desired to release the brake pawl 14 from contact with the parking gear 12, the rotary shaft 15 is rotated in a clockwise direction as viewed in FIG. 2. Since the anchor pin 24 secured to the rotary shaft 15 engages with the stop member 29 integrally formed on the cam member 16, movement of the rotary shaft 15 in a clockwise direction will cause movement of the cam member 16 in the same clockwise direction. This causes the enlargement 22 to move out of engagement with the cam surface 28 and into engagement with the minor diameter part 44 of the cam member 16, so that the brake pawl 14 is released from the braking position.

Figure 11:
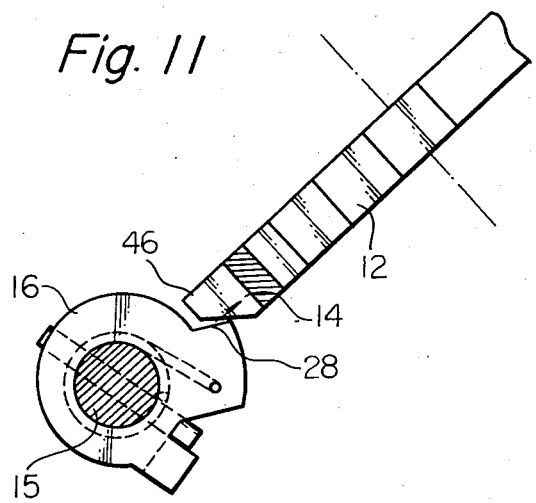
FIG. 11 is a side view of the parking brake of FIG. 10 as viewed in a direction of arrow XI.
Figure 10:
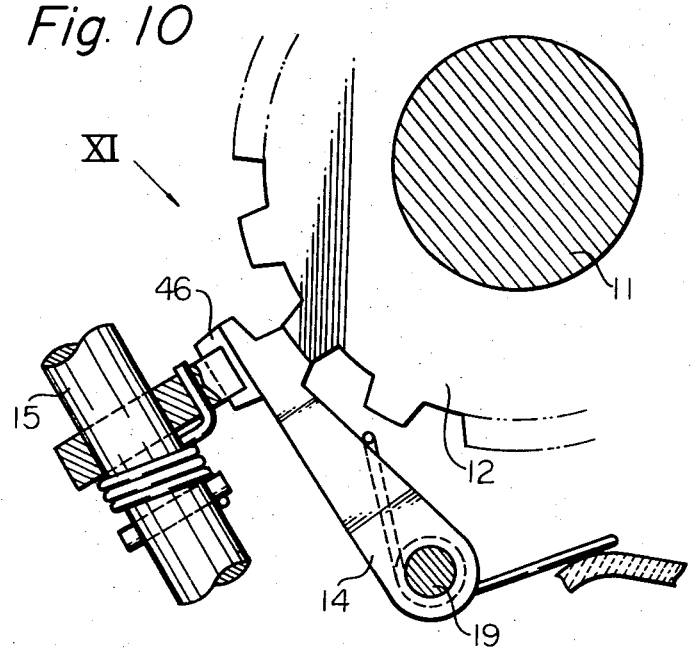
FIG. 10 is a schematic diagram showing a parking brake according to another embodiment of this invention.

Referring to FIGS. 10 and 11, there is shown a modified parking brake mechanism which is identical to that shown in FIGS. 1 through 9 except that the rotary shaft 15 is journaled in the housing 10 in perpendicular relationship with the output shaft 11 and the pin 19 about which the brake pawl 14 is angularly oscillatable. The parts that are common to the mechanism described with reference to FIGS. 1 through 9 have been designated hereinafter by corresponding reference characters. In this embodiment, a heel portion 46 of the brake pawl 14 is moved in a direction of arrow under the influence of the camming action of the cam surface 28 of the cam member 16 as the rotary shaft 15 is rotated in a counterclockwise direction as viewed in FIG. 11.

Figure 12:
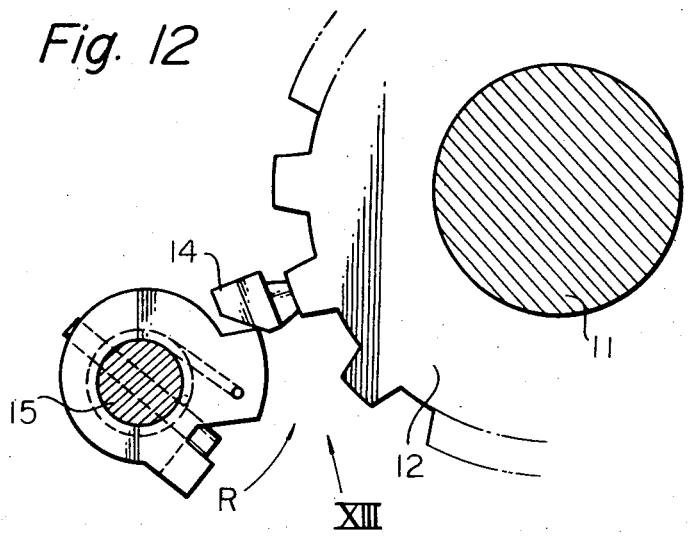
FIG. 12 is a schematic diagram showing a parking brake according to a further embodiment of this invention.
Figure 13:
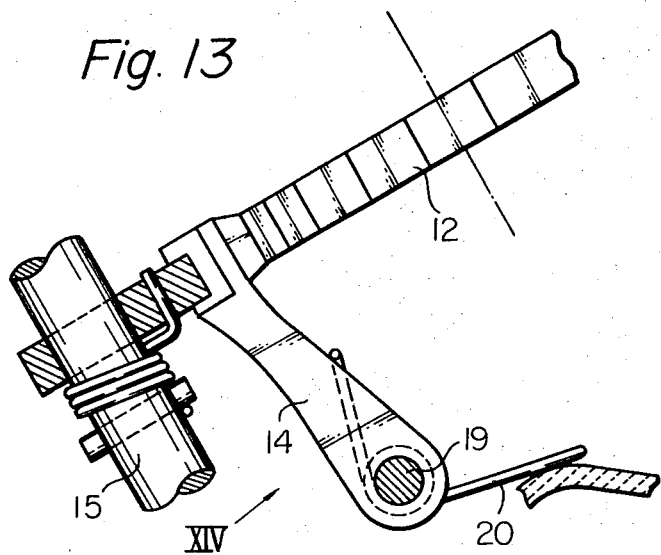
FIG. 13 is a side view of the parking brake of FIG. 12 as viewed in a direction of arrow XIII.
Figure 14:
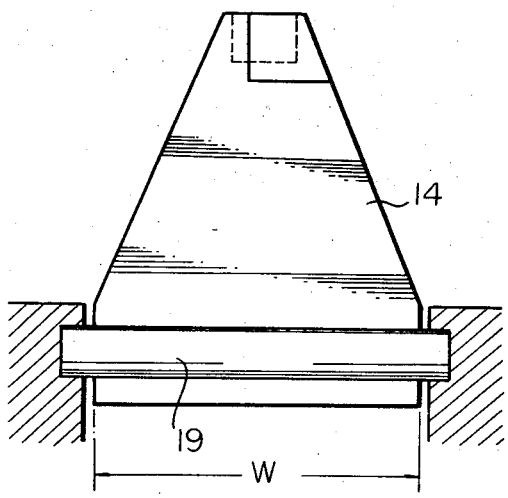
FIG. 14 is a side view of a brake pawl of the parking brake shown in FIG. 13, as viewed in a direction of arrow XIV.

FIGS. 12 through 14 show another modified parking brake mechanism which is different from that shown in FIGS. 1 through 9 in that the brake pawl 14 is angularly oscillatable about an axis generally perpendicular to the output shaft 11 and rotary shaft 15 which are journaled in the housing 10 in parallel to each other. In this embodiment, the brake pawl 14 may preferably have a sufficient width to resist a widthwise braking reaction force as shown in FIG. 14.

Figure 15:
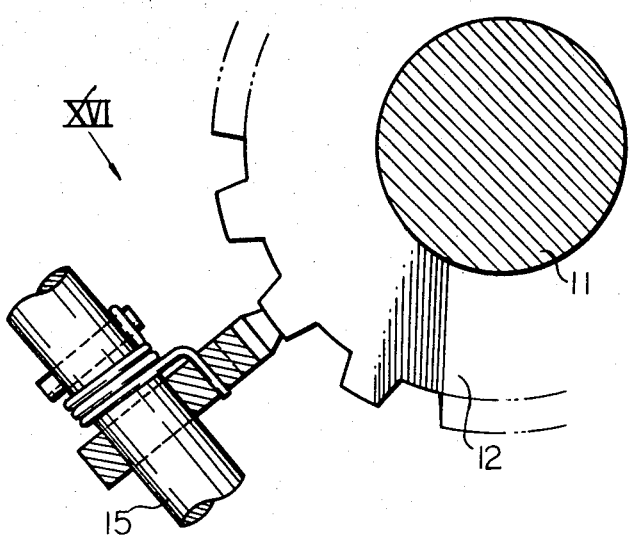
FIG. 15 is a schematic diagram showing a parking brake according to a still further embodiment of this invention.
Figure 16:
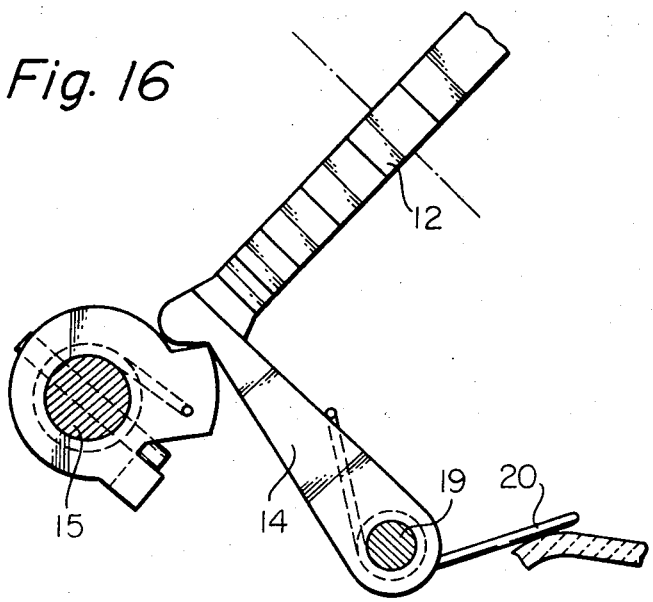
FIG. 16 is a side view of the parking brake of FIG. 15 as viewed in a direction of arrow XVI.

FIGS. 15 and 16 show still another modification of the parking brake of this invention, which is different from that shown in FIGS. 10 and 11 in that the rotary ahaft 15 is angularly oscillatable about an axis generally perpendicular to the axis of the output shaft 11. in this embodiment, since the brake pawl 14 is subject to widthwise braking reaction force as is the case with the embodiment shown in FIGS. 12 through 14, the brake pawl 14 should have a large width.

What is claimed is:

1. A parking brake for locking a parking gear carried by an output shaft of an automatic power transmission mechanism, said output shaft being rotatably journaled in a relatively stationary housing, comprising: a brake prawl mounted on at one end thereof said housing for angular oscillation into and out of engagement with said parking gear at the other end thereof, a first spring means for normally biasing said brake pawl out of engagement with said parking gear; a rotary shaft rotatably journaled in said housing and connected to a manually operable member through a mechanical linkage for changing its angular position; a cam member rotatably mounted around said rotary shaft and having a cam surface configured to engage with the other end of said brake pawl; and a second spring means mounted around said rotary shaft and having one end connected to said rotary shaft and the other end connected to said cam member for biasing against the action of said first spring means the other end of said brake pawl through said cam surface into engagement with said parking gear in accordance with the angular position of said rotary shaft, whereby said parking gear is locked by said brake pawl against rotation in either direction after said parking gear has been slightly rotated under the bias condition of said second spring means, the angular oscillation of said brake pawl being carried out about an axis generally parallel to the axis of said output shaft, and the rotation of said rotary shaft being carried out about said axis generally perpendicular to said axis of said output shaft.

2. A parking brake according to claim 1, further comprising an anchor pin carried by said rotary shaft and connected to said one end of said second spring means for limiting the relative angular movement of said cam member when said anchor pin is engaged with a portion of said cam member.

3. A parking brake for locking a parking gear carried by an output shaft of an automatic power transmission mechanism, said output shaft being rotatably journaled in a relatively stationary housing, comprising: a brake pawl mounted on at one end thereof said housing for angular oscillation into and out of engagement with said parking gear at the other end thereof; a first spring means for normally biasing said brake pawl out of engagement with said parking gear, a rotary shaft rotatably journaled in said housing and connected to a manually operable member through a mechanical linkage for changing its angular position; a cam member rotatably mounted around said rotary shaft and having a cam surface configured to engage with the other end of said brake pawl; and a second spring means mounted around said rotary shaft and having one end connected to said rotary shaft and the other end connected to said cam member for biasing against the action of said first spring means the other end of said brake pawl through said cam surface into engagement with said parking gear in accordance with the angular position of said rotary shaft, whereby said parking gear is locked by said brake pawl against rotation in either direction after said parking gear has been slightly rotated under the bias condition of said second spring means, the angular oscillation of said brake pawl being carried out about an axis generally perpendicular to the axis of said output shaft, and the rotation of said rotary shaft being carried out about an axis generally parallel to the axis about which said brake pawl is oscillatable.

* * * * *